July 23, 1974 E. G. BULIN 3,825,639
METHOD OF ENCAPSULATION ELECTRIC EQUIPMENT
Filed Aug. 30, 1972
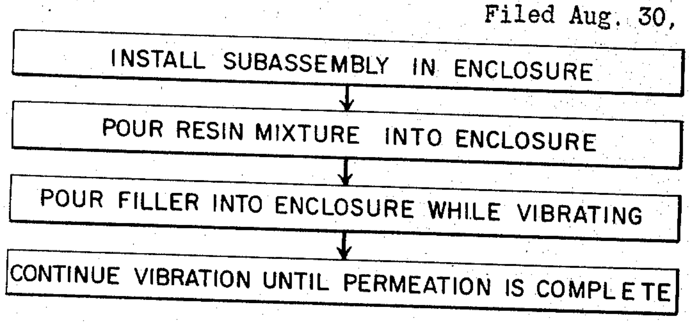
FIG. 1
FIG. 4
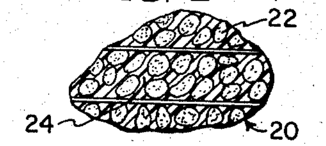
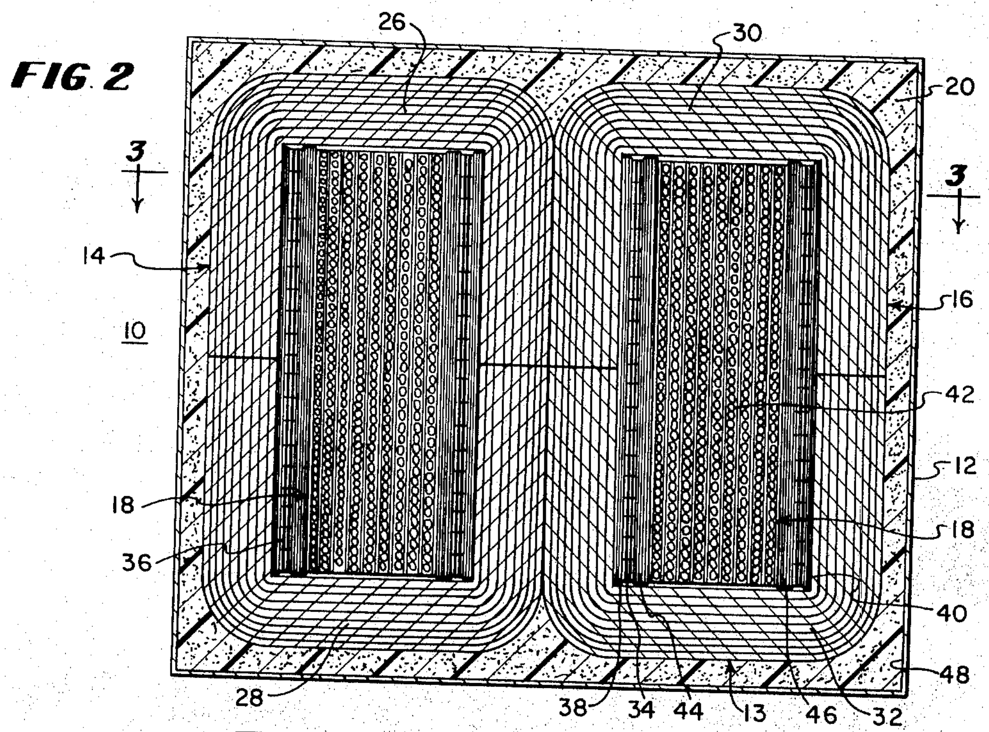
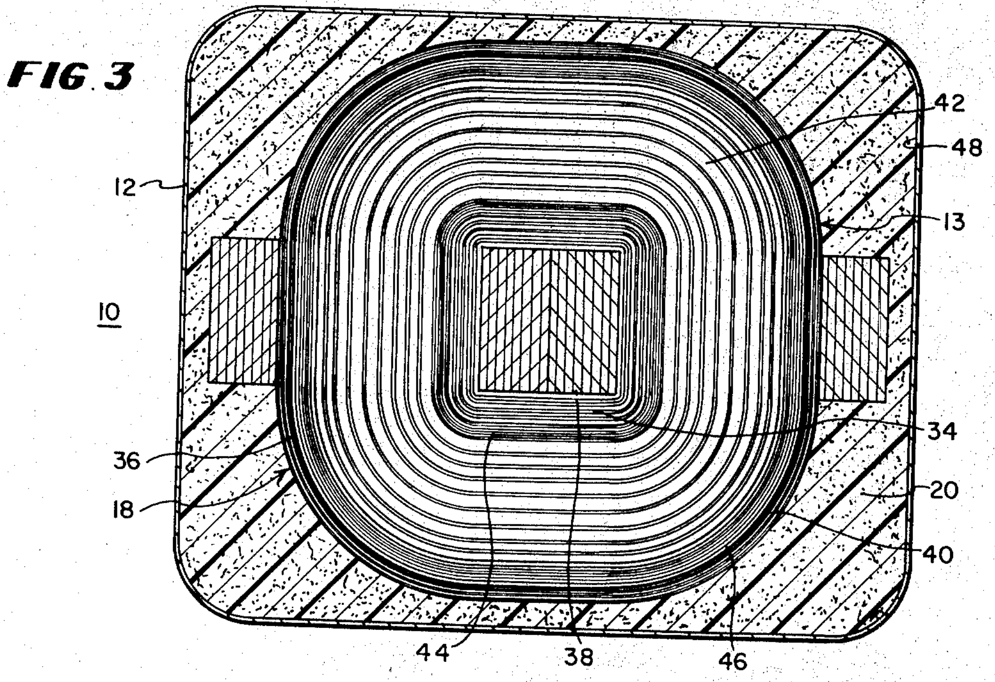

United States Patent Office 3,825,639
Patented July 23, 1974

3,825,639

METHOD OF ENCAPSULATING ELECTRIC EQUIPMENT

Edward G. Bulin, Reedsburgh, Wis., assignor to Webster Electric Company, Inc., Racine, Wis.

Continuation-in-part of application Ser. No. 223,178, Feb. 3, 1972. This application Aug. 30, 1972, Ser. No. 284,772
The portion of the term of the patent subsequent to Mar. 5, 1991, has been disclaimed
Int. Cl. B29c *6/02*
U.S. Cl. 264—72 6 Claims

ABSTRACT OF THE DISCLOSURE

A method of encapsulating electrical equipment comprises the steps of (a) placing the electrical equipment into an enclosure or casing, (b) pouring a resin-catalyst mixture into the enclosure, (c) pouring a filler into the enclosure while vibrating the enclosure at a frequency that is continually maintained at substantially the resonant frequency of the enclosure, the equipment, the resin-catalyst mixture and the portion of the filler added to the enclosure, and (d) continuing the vibration of the enclosure at the resonant frequency of the enclosure, the equipment, the resin-catalyst mixture and the filler until the resin-catalyst mixture has substantially permeated the filler.

The present application is a continuation-in-part of application Ser. No. 223,178, filed on Feb. 3, 1972.

This invention relates to a method for encapsulating electrical equipment in a potting material, and more particularly, to an improved method of completely encapsulating the electrical equipment with a filler and resin potting material so that the filler material is completely and uniformly dispersed throughout the resin mixture.

In most electrical devices such as transformers, chokes, or the like, wherein electrical equipment or subassemblies are placed into a suitable enclosure or casing, a potting material is utilized to encapsulate the equipment and to fill all of the voids or spaces between the enclosure and the equipment. The type of potting material utilized normally is selected to provide the most desirable characteristics for electrical insulation, heat transfer, moisture exclusion and other related features necessary for the intended use of the device.

For a considerable period of time, the only available types of potting material were an assortment of waxes, tars or mixtures thereof, none of which provided the desired characteristics. For example, certain tars, having sufficient plasticity to withstand cracking when the temperature of the electrical device was lowered, would tend to melt at an undesirable low temperature when the temperature of the device was increased due to the loading of the device. Consequently, the electrical performance of such devices would be limited to an uneconomical conservatively low degree of loading. On the other hand, certain waxes capable of withstanding very high temperatures without melting enabled the electrical performance of the device to be advantageously increased, but the waxes became unreasonably brittle as the temperature of the device was lowered.

In an attempt to improve the characteristics of these materials, inert fillers, such as glass, granite chips, asbestos, glass fibers, or the like, were added to these materials. Unfortunately, the addition of these inert fillers often time corrected or improved one characteristic, but introduced other problems. Thus, in order to improve the thermal conduction between transformer equipment or subassemblies and the enclosure of the transformer, granite chips were mixed with tar to form the potting material. The chips had to be well distributed throughout the tar to provide maximum cooling, but small enough to avoid having the chips lodge in small spaces around the subassemblies where they might divert the pouring flow and/or cause voids in the potting material. However, finely divided materials, such as the granite chips, increased the viscosity of the mixture so that the resulting potting material would not flow properly. On the other hand, if fairly large particles of granite chips were utilized, the particles would not make sufficient contact with each other, and the potting material did not provide the optimal thermal conducition.

In relatively recent years plastic materials or resins such as epoxies, polyesters and the like, which have suitable physical and electrical properties when cured, have been used more widely as a potting material for electrical equipment of the type heretofore described. Most of these plastic materials are utilized with a filler material such as silica sand or the like which not only improves the thermal conduction and physical strength of the potting material, but also increases the amount of potting material, without a proportional increase in the expense of the material since the filler material costs substantially less than the plastic material. Unfortunately, most of the plastic potting materials flow readily so that the filler solids tend to drop out of suspension rapidly and the filler material is not properly distributed throughout the plastic mixture. In order to prevent the filler solids from dropping out of the suspension, the filler material can be finely divided, but the resulting slurry has such a high viscosity that it is difficult to purge air from overhung pockets in the enclosure of the electrical devices or to fill the very small voids around the subassemblies contained within the devices.

In order to obtain a more uniform dispersion of the filler material in the slurry while not producing a slurry with excesisve viscosity, the devices can be vibrated on a vibrating table or the like as the slurry is added to the enclosure. Nonetheless, even if the mixture of plastic material or resin and filler material is poured into the enclosure while vibrating, the amount of filler material in the mixture is strictly limited by the fact that the viscosity of the slurry cannot be increased too high since the resulting slurry will neither pour properly nor allow the proper venting of the enclosure prior to the curing of the potting material.

Alternately, the filler material can be placed into the enclosure first and the enclosure vibrated prior to the pouring of the resin mixture into the enclosure. However, since the resin tends to coat the top surface of the filler material, proper venting of the enclosure is prohibited, and there is no assurance that the resin will properly penetrate into all portions of the subassemblies contained within the enclosure. Even when the vibration is continued during the pouring of the resin mixture into the filler material, the filler material tends to impede the resin mixture from properly encapsulating the equipment.

On the other hand, the resin mixture can be placed into the enclosure first and thereafter, the enclosure can be vibrated. However, if the vibration of the enclosure is discontinued prior to the addition of the filler material, the filler material does not completely disperse throughout the resin mixture, and the amount of filler material that can be placed into the enclosure with respect to the amount of resin mixture is limited.

Accordingly, objects of the present invention are to provide a new and improved method of encapsulating electrical equipment with a filler and resin potting material so that the resin portion adequately impregnates the equipment; the filler material is completely and uniformly dispersed throughout the resin mixture so as to provide the desired heat transfer characteristics for the potting material; air is allowed to be expelled or purged from the potting material to insure the absence of voids around the equipment; and a substantial portion of the potting material can be formed of the filler material with the remaining portion consisting of the resin mixture.

In accordance with these and many other objects, an embodiment of the present invention comprises a method of encapsulating electrical equipment with a potting material that has desirable electrical and thermal characteristics. The encapsulating method includes the steps of placing relatively moisture free equipment into an enclosure, pouring a fluid resin-catalyst mixture into the enclosure, pouring a sand filler into the enclosure while vibrating the enclosure at a frequency that is constantly adjusted to substantially the resonant frequency of the enclosure, the equipment, the resin-catalyst mixture, and the portion of the filler material added to the enclosure, continuing the vibration of the enclosure at the resonant frequency of the enclosure, the equipment, the resin-catalyst mixture and the filler until such time as the resin-catalyst mixture sufficiently permeates and disperses through the sand filler, and finally allowing the potted assembly properly to cure. In the preferred method of the present invention, the enclosure can be additionally vibrated during the pouring of the resin-catalyst mixture into the enclosure.

Many other objects and advantages of the present invention will become apparent from considering the following detailed description in conjunction with the drawings in which:

FIG. 1 is a flow diagram of the process comprising the present invention;

FIG. 2 is a vertical, cross-sectional view of a transformer which has been encapsulated in accordance with the method comprising the present invention;

FIG. 3 is a cross-sectional view taken along line 3—3 of FIG. 2; and

FIG. 4 is an illustrative enlarged, microscopic view of a portion of the potting material with which the transformer of FIGS. 2 and 3 has been encapsulated.

Referring now to FIG. 1, there is shown a flow diagram setting forth the steps embodying the present invention. As indicated in the flow diagram, a subassembly or equipment for an electrical device is first installed into the enclosure or outer casing forming the device which is to be encapsulated in the potting material. Once the equipment has been properly mounted in the enclosure, an appropriate resin mixture is poured into the enclosure of the device, and thereafter while the enclosure is vibrated, a filler material is added to the enclosure. The frequency of the vibration of the enclosure is continually adjusted so that the frequency of vibration is maintained at substantially the resonant frequency of the enclosure, the equipment contained therein, the resin mixture which has been poured into the enclosure, and the portion of the filler material added to the enclosure. The vibration of the enclosure and the materials contained therein is continued at the resonant frequency of the enclosure and the materials contained therein until such time as the resin mixture completely permeates through the filler material so that the interior of the enclosure and the equipment therein contained are completely encapsulated in the potting material.

More specifically, prior to the installation of the equipment or subassemblies into the enclosure of the electrical device, the equipment can be heated to an appropriate temperature, such as 300° F., for a sufficient time to render the equipment substantially moisture-free so as to insure the proper encapsulation of the equipment in the potting material. On the other hand, this drying process of the equipment can be accomplished after the equipment has been placed into the enclosure since the enclosures are also heated to a sufficient temperature, such as the 300° F., to insure that the enclosure itself is moisture-free.

Once the equipment is dried and properly installed in the enclosure by adequately supporting it and providing any necessary auxiliary devices, the resin mixture that is to form a small portion of the potting material is then poured into the enclosure. The resin mixture can consist of an epoxy resin and some type of catalyst which are mixed together. One type of epoxy resin mixture that has been found suitable for this purpose is resin No. 83–550 having a catalyst No. C–180 both of which are obtainable from the Sterling Varnish Company. To facilitate the pouring of the resin mixture into the enclosure, the mixture is preheated to produce maximum fluidity of the resin mixture. Although not essential to the present invention, the enclosure and subassemblies contained therein can be placed on a vibrating apparatus, such as a vibratory table or the like, and vibrated at an appropriate frequency, such as 30 cycles per second, while the resin mixture is being poured into the enclosure.

Of course, the enclosure can be vibrated at the resonant frequency of the enclosure, subassemblies contained therein and the resin mixture. However, since the resin mixture is a fluid, some of the resin mixture tends to be thrown out of or expelled from the enclosure, and normally a set or constant frequency, such as the 30 cycles per second, is utilized when the enclosure is vibrated during the addition of the resin mixture to the enclosure.

After the pouring of the resin mixture into the enclosure has been completed, the filler material, such as silica sand, blasting sand or the like, that has been heated to render it moisture-free, is then gradually added to or poured into the enclosure. During the pouring of the filler material into the enclosure, the enclosure and the equipment therein are vibrated on a vibratory table or the like. Although the frequency of the vibration of the enclosure can be maintained at a specific or constant frequency, such as 30 cycles per second, the resin mixture tends to be more readily diffused or permeated throughout the filler material if the frequency of vibration is maintained at substantially a resonant frequency of what might be termed a consolidated or combined mass of the enclosure, which consolidated mass includes the enclosure, the equipment contained therein, the resin mixture and the filler material. The resonant frequency of this consolidated mass is continually changing or is altered as the mass is increased with the addition or pouring of the filler material into the enclosure. Thus, as the filler material is added to the enclosure, the frequency of vibration must be continually adjusted with changes in the consolidated mass so as to maintain the frequency of vibration at substantially the resonant frequency of the consolidated mass.

Normally, the resonant frequency of the consolidated mass decreases with the addition of the filler material into the enclosure. Even though the resonant frequency of the consolidated mass of the enclosure is not necessarily accurately calculable at each instance of time during the addition of the filler material into the enclosure, the frequency of vibration can be maintained at substantially the resonant frequency of the consolidated mass by visually observing the waveform on the surface of the potting material. Moreover, as the frequency of vibration approaches the resonant frequency of the consolidated mass of the enclosure, the power required to vibrate the vibratory table tends to substantially decrease. Thus, the decrease of power supplied to the vibrating apparatus can be an additional factor indicating that the enclosure is being vibrated at the appropriate frequency.

Even though the shake excursion of the vibration of the enclosure can be as little as 1/64 of an inch, the vibration of the enclosure enables the filler material to be more uniformly dispersed to all parts of the enclosure and enables the resin mixture to be more uniformly diffused or permeated throughout the filler material. The permeation action of the resin mixture throughout the filler material also tends to be assisted by capillary action. The shaking or vibration of the enclosure is continued at the resonant frequency of the consolidated mass until the resin material works upwards through the mass of filler material and appears on the upper surface of the filler material which indicates that the resin mixture has completely permeated throughout the filler material. The upward progress of the resin mixture through the filler material also allows any air in the enclosure to be freely vented through or purged from the unobstructed structure.

Thereafter, the potted assembly can be removed from the vibratory table or the like on which it has been vibrated, and the potted assembly is allowed to cure conventionally in an oven if additional heat is necessitated or at room temperature if the epoxy resin is of the type that cures without the addition of heat. With the curing of the potted assembly, the encapsulation of the subassemblies and the interior of the electrical apparatus is completed.

As previously indicated, the improved method of the present invention can be used in encapsulating equipment in various types of electrical devices. One such type of device with which the method of the present invention is utilized is an electrical transformer 10 shown in FIGS. 2 and 3. The electrical transformer 10 is defined by an outer casing or enclosure 12 in which is disposed appropriate equipment or subassembly 13 consisting of a pair of cores 14 and 16 and a coil structure 18. The cores 14 and 16 and the coil structure 18 are shown to be completely encapsulated in a potting material 20 formed by the novel method of the present invention. By utilizing the novel method of the present invention and as can be seen in FIG. 4 of the drawings, the potting material 20 is partly formed of a filler material consisting of sand particles 22 that are rather uniformly dispersed throughout a resin mixture 24 forming the other part of the potting material 20. With the sand particles 22 uniformly distributed throughout the resin mixture 24, the potting material 20 provides the optimal heat transfer characteristics between the equipment 13 and the enclosure of the transformer 10.

The cores 14 and 16 are formed of a laminated grain oriented steel. The core 14 is cut along a plane so as to form a pair of C-shaped core structures 26 and 28 and the core 16 is similarly cut along a plane to provide a pair of C-shaped core structures 30 and 32. The cutting of the cores 14 and 16 into the core structures 26, 28, 30 and 32 enables the core structures to be placed in end-to-end relationship and butted together about the coil structure 18 within the enclosure 12. Although not shown in the drawings, the cores 14 and 16 and the coil structure 18 are held in place within the enclosure 12 by appropriate supports and connected to the exterior of the enclosure 12 by suitable electrical connections.

The coil structure 18 not only contains primary and secondary windings, but also appropriate layers of insulating paper. More specifically, an inner secondary winding 34 and an outer secondary winding 36 consisting of wound aluminum strips or the like with paper layers between each strip of aluminum are insulated from the inner and outer legs of the cores 14 and 16 by paper layers 38 and 40, respectively. Similarly, the high voltage primary winding 42 formed of appropriate sized wire and insulating paper is insulated from the inner secondary winding 34 by a paper layer 44 and from the outer secondary winding 36 by a paper layer 46.

As can be readily seen from the FIGS 2 and 3, the encapsulating of the equipment 13 in the potting material 20 by the improved method of the present invention not only enables the entire interior 48 of the transformer 10 to be filled, but also enables the equipment 13 to be penetrated by the resin mixture 24 to a greater extent than most any other type of prior art method. In fact, the resin mixture 24 tends to impregnate the cores 14 and 16 and the coil structure 18 to an extent that has only been accomplished during a rather costly and time consuming vacuum impregnation of such assemblies by an epoxy resin mixture.

In addition, the potting material 20 is formed at a substantially less cost than previous potting materials. The potting material 20 formed by the present invention can consist of as little as 20% epoxy resin mixture 24 with the remaining portion of the potting material 20 consisting of a silica sand mixture having sand particles 24. In the past, the potting material formed by previous methods required the utilization of at least 40% epoxy resin mixture. Since the filler material costs substantially less than the epoxy resin mixture, the amount of potting material 20 can be substantially increased without the proportional increase in the cost of the potting material 20. Also, advantageously, by utilizing the novel method of the present invention, practically all of the air from the enclosure 12 is expelled during the encapsulation of the equipment 13 and seemingly there are no apparent voids within the potting material 20.

While the present invention has been described in connection with the details of one illustrative embodiment threof, it should be understood that these details are not intended to be limitative of the invention except insofar as set forth in the accompanying claims.

What is claimed and desired to be secured by Letters Patent of the United States is:

1. A method of potting electrical equipment with a potting material consisting essentially of a resin mixture and a filler material, said method comprising the steps of installing the equipment in an enclosure,
pouring the resin mixture into said enclosure,
initiating the vibration of the enclosure while beginning to pour the filler material into said enclosure,
continuing the pouring of the filler material into said enclosure while continuing the vibration of the enclosure, said vibration of the enclosure being maintained at a frequency which is continually adjusted to maintain the frequency of vibration at substantially the resonant frequency of said enclosure, said equipment, and said potting material added to said enclosure, and
continuing the vibration of the enclosure at the resonant frequency of the enclosure, the equipment, and the potting material until said resin mixture has substantially permeated the filler material.

2. The method of claim 1 wherein said resin mixture is formed of an epoxy resin and a catalyst.

3. The method of claim 1 wherein said filler material has silica sand.

4. A method for encapsulating electrical equipment in an enclosure with a potting material including a resin mixture and a filler material, said method comprising the steps of adding the resin mixture into said enclosure after the equipment is installed in said enclosure,
vibrating the enclosure while beginning to add the filler material into said enclosure,
continuing the addition of the filler material into said enclosure while continuing to vibrate the enclosure, during which time the enclosure is vibrated at a frequency which is continually adjusted so that the frequency is maintained at substantially the resonant frequency of the combined mass of the enclosure, the equipment, the resin mixture, and the portion of the filler material added to the enclosure, and
continuing the vibration of the enclosure after the filler material has been added to the enclosure at a frequency which is substantially the resonant frequency of the enclosure, the equipment, and the potting material added to the enclosure until such time as the resin mixture has been uniformly distributed throughout the filler material.

5. The method of claim 4 wherein said enclosure is vibrated during the adding of the resin mixture to the enclosure.

6. The method of claim 4 wherein said resin mixture is a fluid.

References Cited

UNITED STATES PATENTS 3,030,597 4/1962 Piaia ............ 264—272 X

FOREIGN PATENTS 1,250,853 10/1971 Great Britain ........ 264—72

ROBERT F. WHITE, Primary Examiner

T. P. PAVELKO, Assistant Examiner

U.S. Cl. X.R.

264—272